(12) United States Patent
Sasaki et al.

(10) Patent No.: US 6,287,651 B1
(45) Date of Patent: Sep. 11, 2001

(54) CATHODE RAY TUBE GLASS, A METHOD FOR PRODUCING THE CATHODE RAY TUBE GLASS, AND A METHOD FOR CLEANING THE CATHODE RAY TUBE GLASS

(75) Inventors: Mikio Sasaki; Satoshi Rokudai, both of Funabashi (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/081,934

(22) Filed: May 21, 1998

(30) Foreign Application Priority Data

May 23, 1997 (JP) ...................................... 9-134057

(51) Int. Cl.[7] .............................. A47G 19/22; B32B 9/00; H01J 29/10; H01J 29/70
(52) U.S. Cl. .................... 428/34.4; 428/428; 428/36.91; 313/466; 313/479
(58) Field of Search .................. 428/34.4, 35.7, 428/426, 36.91, 428, 432, 436, 438, 439; 313/479, 466

(56) References Cited

U.S. PATENT DOCUMENTS

| | | | |
|---|---|---|---|
| 4,234,669 | * 11/1980 | Pearlman | 430/25 |
| 5,521,292 | * 5/1996 | Ueda et al. | 536/2 |
| 5,717,281 | * 2/1998 | Tong et al. | 313/461 |

FOREIGN PATENT DOCUMENTS

| | | |
|---|---|---|
| 6-340865 | 12/1994 | (JP) . |
| WO 95/34608 | 12/1995 | (WO) . |

OTHER PUBLICATIONS

Patent Abstracts of Japan, vol. 095, No. 003, Apr. 28, 1995, JP 06–340865, Dec. 13, 1994.

* cited by examiner

Primary Examiner—Rena L. Dye
Assistant Examiner—Michael C. Miggins
(74) Attorney, Agent, or Firm—Oblon, Spivak, McClelland, Maier & Neustadt, P.C.

(57) ABSTRACT

A cathode ray tube glass comprises a clean cathode ray tube made of glass and a coating film composed of at least one water-soluble material selected from the group consisting of water-soluble salts, acids being solid at room temperature, monosaccharides and polysaccharides, which is formed on a glass surface of the cathode ray tube in an amount of 0.01–100 $\mu g/cm^2$ or to a film thickness of 0.1–200 nm.

8 Claims, 6 Drawing Sheets

CATHODE RAY TUBE GLASS, A METHOD FOR PRODUCING THE CATHODE RAY TUBE GLASS, AND A METHOD FOR CLEANING THE CATHODE RAY TUBE GLASS

BACKGROUND OF THE INVENTION

1. Field of the Invention

The present invention relates to a cathode ray tube glass coated with a water-soluble coating film, a method for producing the cathode ray tube glass, and a method for cleaning the cathode ray tube glass.

2. Description of the Background

For avoiding or removing contaminants attached to a surface of a cathode ray tube glass such as a panel glass, a funnel glass and so on during manufacture, processing, storage and transportation of it, there have been practiced: (1) a method for cleaning the atmosphere around such glass; (2) a method for preventing such glass from the contact with a container for storage and so on; (3) a method for preventing the deposition of contaminants due to material existing around such glass; and (4) a method for removing contaminants by a washing treatment having a physical or chemical effect before a necessary operation. Further, as a new cleaning method utilizable generally for glass, there has been proposed such a method that a coating film is formed by applying previously a water-soluble salt on a glass surface so that contaminants which may be attached onto the coating film are dissolved and removed together with the coating film by washing (JP-A-6-340865).

Various surface treatments such as coating of a fluorescent material, coating of an electric conductive graphite, coating of an antireflection film and so on are conducted to a surface of the cathode ray tube glass. In this case, when a slight amount of contaminants are attached to the surface, water repellency is effected to thereby cause difficulty in conducting the normal coating operations. Even though the coating operations have been completed, there is still a danger of inducing a defect in patterning a fluorescent material or an insufficient electric strength owing to remaining contaminants. Therefore, an extremely high cleanness is required for the cathode ray tube glass in comparison with a glass product for another usage.

Figure 1:
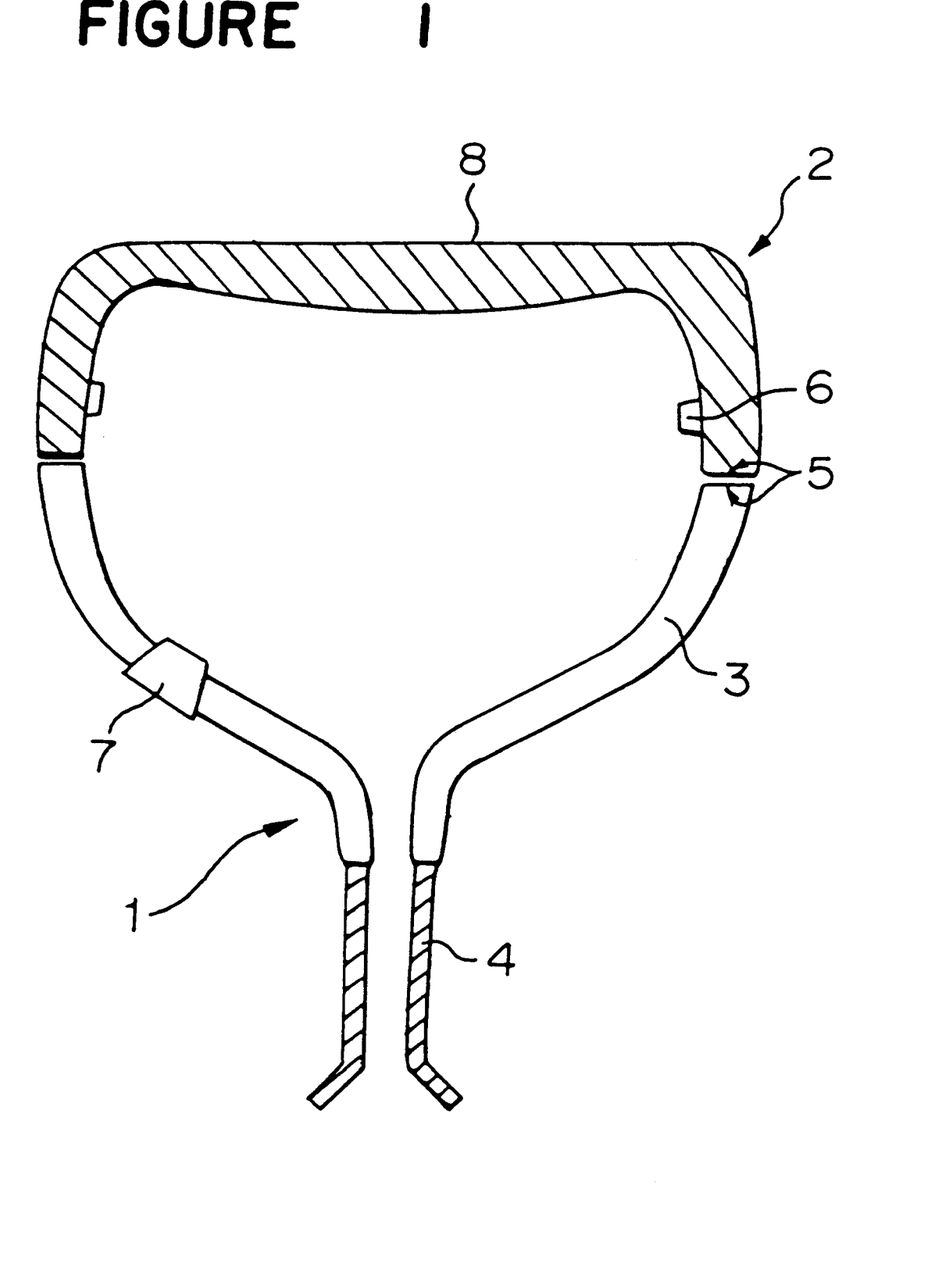
FIG. 1 is a longitudinal cross-sectional view of a typical cathode ray tube.

The cathode ray tube glass comprises generally a panel glass and a funnel glass. FIG. 1 shows a construction of the cathode ray tube glass wherein reference numeral 1 designates a funnel glass, numeral 2 a panel glass, numeral 3 a funnel portion, numeral 4 a neck tube portion, numeral 5 a seal edge portion, numeral 6 a pin, numeral 7 an anode button, and numeral 8 a face portion. Hereinbelow, a body formed by sealing the neck tube portion to the funnel portion is simply referred to as the funnel glass.

Generally, glass products such as panel glass, funnel portions, neck tube portions and so on, after having been shaped and processed, are transported to and stored in a warehouse or the like for a predetermined term until they undergo joining and sealing operations or surface treatments. Accordingly, it is very difficult to completely avoid contamination due to a slight amount of contaminants which may be attached to a glass surface of them even though care is taken for cleaning the atmosphere around the glass products or choosing a suitable wrapping material in order to avoid such contamination.

Further, once the contaminants have attached to the glass surface, reactions occur on the glass surface with a lapse of time to increase an adhesive force. Accordingly, in many cases, the contaminants on the glass surface can not be removed by simply washing operations. It is, therefore, necessary to conduct washing with a strong acid or alkali such as hydrofluoric acid or sodium hydroxide or the like, or to use above-mentioned washing with another washing operation utilizing a physical effect. However, these forcible washing operations are troublesome in use; an increase of cost is invited and there is a danger of causing an additional defect on the glass surface which have been finely processed. Further, these forcible operations cause difficulty in draining a waste solution from the standpoint of environmental protection.

The technique disclosed in JP-A-6-340865 does not mention in a concrete manner such means for providing an excellent cleaning performance required for the cathode ray tube glass or eliminating an adverse effect, to a TV characteristic, caused by a water-soluble material which may remain on the glass surface.

SUMMARY OF THE INVENTION

It is an object of the present invention to provide a cathode ray tube glass, a method for producing the cathode ray tube glass and a method for cleaning the cathode ray tube glass, wherein contaminants inevitably attached onto a surface of the cathode ray tube glass during manufacturing, processing, transporting and storing can easily and effectively be removed.

DETAILED DESCRIPTION OF THE PREFERRED EMBODIMENTS

In accordance with the present invention, there is provided a cathode ray tube glass which comprises a clean cathode ray tube made of glass and a coating film composed of at least one water-soluble material selected from the group consisting of water-soluble salts, acids being solid at room temperature, monosaccharides and polysaccharides (hereinbelow, referred to simply as the water-soluble coating film), which is formed on a glass surface of the cathode ray tube in an amount of 0.01–100 $\mu g/cm^2$.

In the present invention, it is important that an amount of a coating film attached to the glass surface (in a dried state) is 0.01–100 $\mu g/cm^2$ in order not to cause any defect in the water-soluble coating film and not to damage the transparency of the glass. A precise analysis to an amount of the attached coating film in accordance with an ESCA surface analysis revealed to be 0.1–200 nm when the amount of the attached coating film is converted into a film thickness.

Therefore, in accordance with the present invention, there is provided a cathode ray tube glass which comprises a clean cathode ray tube made of glass and a coating film composed of at least one water-soluble material selected from the group consisting of water-soluble salts, acids being solid at room temperature, monosaccharides and polysaccharides, which is formed on a glass surface of the cathode ray tube to a film thickness of 0.1–200 nm.

In the present invention, it is important to previously form the water-soluble coating film in an optimum amount to obtain a defectless, uniform coating film on a glass surface of the cleaned cathode ray tube glass (hereinbelow, referred to simply as the glass surface). The presence of the coating film prevents contaminants, which are inevitably deposited on the glass surface during transportation and storage and so on, from adhering on the glass surface. Further, these contaminants can be removed together with the water-soluble coating film by conducting a simple washing treatment to the glass surface. As a result, even though the glass surface is stained with contaminants during storage and transportation, it is easy to restore a cleaned glass surface in the cathode ray tube glass.

BEST MODE FOR CARRYING OUT THE INVENTION

As the water-soluble coating film used for the present invention, it is preferable to use a material capable of forming a thin, uniform coating film having high film-forming properties on the glass surface in addition to satisfying basic requirements such as high solubility to water, inexpensiveness, non-toxicity etc. In order to realize such a state of film coating, it is desirable to use a material capable of forming a coating film in an amorphous state rather than a material which causes a granular crystal on the glass surface.

The water-soluble material used is at least one selected from the group consisting of water-soluble salts, acids being solid at room temperature, monosaccharides and polysaccharides.

As the water-soluble salts, at least one selected from the group consisting of carbonates, bicarbonates, nitrates, sulfates, phosphates, silicates, organic salts, borates and double salts of such salts is used, for example.

As the acids being solid at room temperature, at least one selected from the group consisting of orthoboric acid, orthophosphoric acid and organic acids is used, for example.

As the monosaccharides, glucose and/or galactose is used, for example.

As the polysaccharides, starch and/or agar is used, for example.

The cathode ray tube glass (for example, a funnel glass and a panel glass) of the present invention, on which the water-soluble coating film as a protective film for contaminants is formed on its surface, is generally subjected to various surface treatments after the coating film has been dissolved and removed; then, is subjected to a sealing operation wherein opposing seal edge faces of the funnel glass and the panel glass are sealingly connected with frit glass at about 450° C.; and then, is subjected to evacuation of air at about 350° C. When the water-soluble coating film is to be removed by washing and if a part of the coating film remains on the glass surface, a coating film forming material is thermally decomposed in the steps of heat treatments. Then, the thermally decomposed material may be deposited on an electrode of an electron gun during the evacuation step whereby the electron emitting performance of the electron gun after assembling a TV may be decreased.

Accordingly, the water-soluble salts used for the present invention are desirably not to produce a thermally decomposed material or gas harmful to the electron gun at a temperature of 350° C. or less. Further, it is desirable that even when the thermally decomposed material or gas is produced, the material or the gas can easily be discharged out of the vacuum system in the evacuation step. From this viewpoint, an alkali metal halide containing chlorine, fluorine or bromine is not preferable as the water-soluble material.

Further, if an acid coating film composed of acids being solid at room temperature such as orthoboric acid or organic acids covers the surface of a metallic material such as a pin or an anode button which is enclosed in or joined to the cathode ray tube glass, corrosion or oxidation of the metallic material may be accelerated with a lapse of time. From the above-mentioned viewpoint, accordingly, use of the acids being solid at room temperature is not preferable.

A coating film composed of phosphates or borates as alkaline salts is preferably used for the purpose of preventing contamination because these compounds slightly melt the glass surface and form a dense film having a network structure. Further, use of a borate such as lithium tetraborate, sodium tetraborate, potassium tetraborate is preferable rather than phosphates, organic acid salts and saccharides from the viewpoint of preventing a problem of eutrophication of lakes or the like, which may be generated due to a waste solution resulted from the use of these compounds.

A water-soluble coating film having electric conductivity formed on the glass surface provides an antistatic effect to the cathode ray tube glass to thereby minimize deposition of foreign substances such as minute glass particles. This reduces a possibility of causing flaws in the glass surface due to the contact or friction of the glass product with jigs for transportation. The water-soluble coating film having electric conductivity may be formed of a hydrate of the water-soluble salt, for example. Specifically, there are a hydrate of lithium tetraborate, a hydrate of sodium tetraborate, a hydrate of potassium tetraborate.

In the present invention, it is important that an amount of the coating film formed on the glass surface (in a dried state) is 0.01–100 $\mu g/cm^2$, namely, 0.1–200 nm when the amount was converted into a film thickness, in order not to cause a defect in the resulted water-soluble coating film and not to damage transparency of glass.

When the film thickness is less than 0.1 nm, it is difficult to uniformly form a coating film on a surface of the cathode ray tube glass having a complicated curved surface (in particular, of the funnel glass). As a result, there may be a portion where the coating film is not formed on the glass surface whereby contaminants are attached to that portion. This may invite a disadvantage such as water repellency on the glass surface for operations conducted thereafter.

Further, a volume decrease takes place in the water-soluble coating film in a drying step whereby a tensile stress is generated in the interface of the glass and the coating film. When the film thickness of the water-soluble coating film is more than 200 nm, the coating film can not release the tensile stress, and fine cracks may be produced in the film. The fine cracks permit contaminants entering therethrough and reaching the glass surface whereby an anti-staining function can not satisfactory be achieved by the coating film. Further, when condensation takes place on the glass surface during storage, redissolution and drying of the water-soluble coating film progress dominantly from the fine cracks, and ununiformity of the film such as opaqueness progresses.

The opaqueness in the appearance of the water-soluble coating film hinders an inspecting operation to find minute flaws or a defect to the cathode ray tube glass. Accordingly, it is desirable to keep a transparent appearance in the coating film so as not to cause difficulty in the inspecting operation. Further, when the coating film is washed with water to remove it in a predetermined time of treatment and if the film thickness is too large, there is a possibility that a part of the coating film is left. Accordingly, the residue of the water-soluble coating film having electric conductivity may reduce a resistance desirable for the cathode ray tube itself.

From the above-mentioned viewpoint, the film thickness of the coating film should be 0.1–200 nm, more preferably, 1–50 nm. Further, the film thickness at a neck tube portion of the funnel glass which is required to have a transparent appearance in the inspection of the final product is preferably 1–10 nm.

Various methods such as dipping, spraying (showering), spin coating, roll coating, flexoprinting or the like may be used for coating the water-soluble material on the cathode ray tube glass having a curved shape.

In the funnel glass having a complicated three-dimensional curved surface and including a different kinds of material such as an anode button, the spraying (showering) method is preferably used in consideration of efficiency for industrial production.

The spin coating method or the like is preferably used when only an outer surface of the panel glass is to be coated. Further, a transfer method such as the roll coating method, the flexoprinting method or the like may be used when coating is conducted to only a part of the glass surface.

A concentration of a solution containing the water-soluble material is desirably 0.005–0.1 mol/l from the viewpoints of easiness of removing the coating film at the time of washing, cost, a treatment for waste solution and an adjustment of the film thickness of the coating film after drying.

For the drying method, a natural drying method or a quick drying method using a jet stream may be used. However, the natural drying method (i.e., air drying) has difficulty in controlling the film thickness. In consideration of controlling the film thickness, use of the quick drying method by a jet stream (e.g. drying with a jet fan) is preferable. In particular, the quick drying method by a jet stream is preferably used for a neck tube portion of the funnel glass or a panel glass face portion to which transparency is required for the inspection of the cathode ray tube glass provided with the coating film.

During transportation, storage and so on, even though contaminants around the glass surface of the cathode ray tube glass deposit on the water-soluble coating film which has previously been formed on the glass surface, there is no danger of stain directly the surface of the glass product.

In accordance with the present invention, there is provided a method for producing a cathode ray tube glass which comprises just before the final step of processing operations necessary for producing a cathode ray tube glass product or just before housing the glass product in a storage container, forming a water-soluble coating film on a glass surface of the cathode ray tube to a film thickness of 0.1–200 nm.

Figure 2:
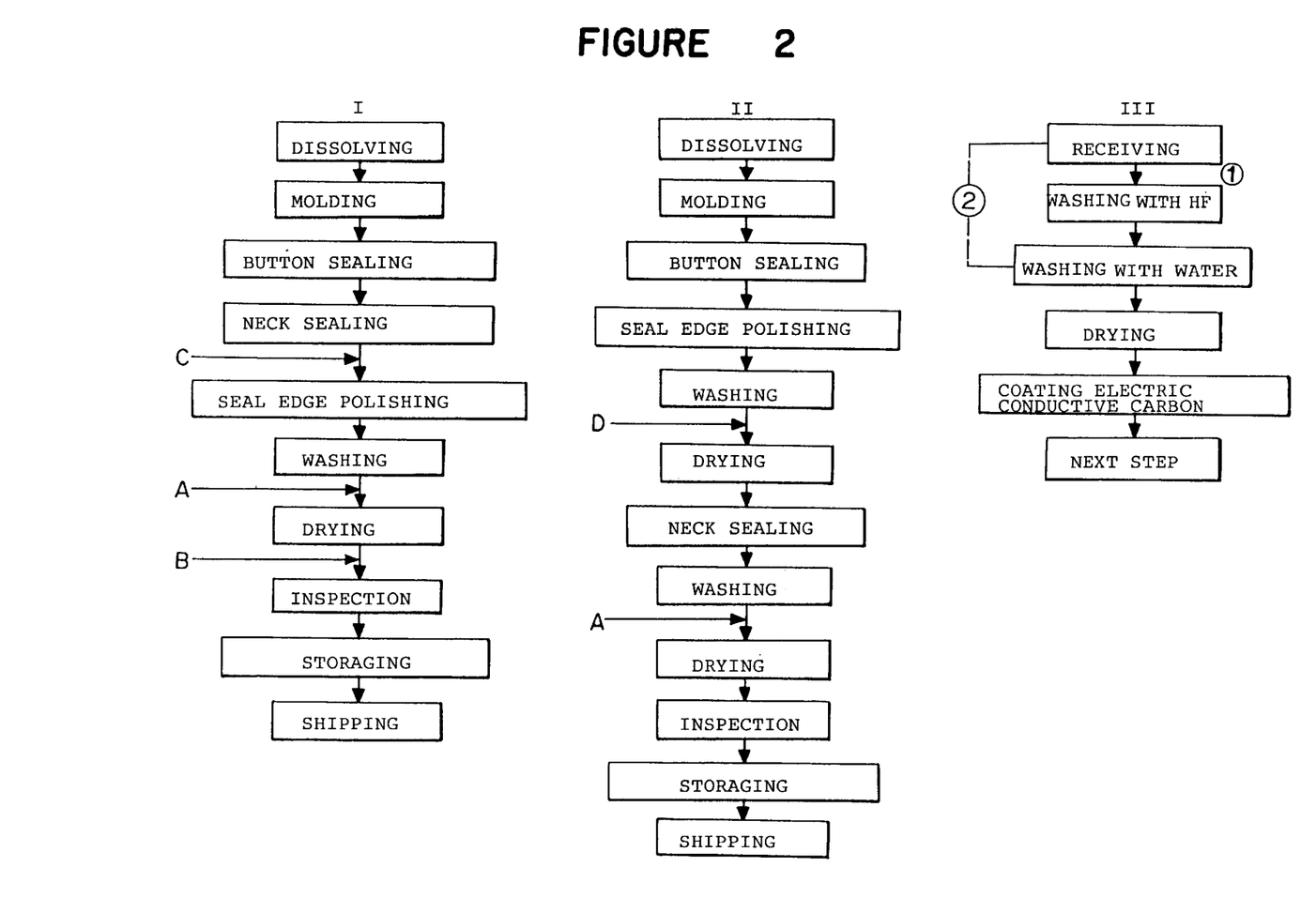
FIG. 2 shows examples of producing a funnel glass according to the present invention.

For the funnel glass, for instance, a polishing operation is conducted to a sealing portion (a seal edge portion), which is to be connected to a panel glass, after an anode button and a neck tube portion have sealingly been attached to the funnel glass (FIG. 2). In this case, it is desirable that just after the final polishing treatment and a washing treatment, the coating film is formed followed by immediately drying, and then, the products are housed in a clean container for storage.

On the other hand, when formation of the coating film is carried out after the glass product has been washed, and after the storage for a predetermined time, contaminants may deposit on a glass surface during the storage. In this case, the contaminants may be left at the interface between the glass surface and the dried coating film. In such a state, the contaminants are left on the glass surface even after the washing operation has been conducted to the coating film, and an anti-staining effect can not be obtained.

In accordance with the present invention, there is provided a method for cleaning a cathode ray tube glass which comprises forming on a glass surface of a cleaned cathode ray tube a coating film composed of at least one water-soluble material selected from the group consisting of water-soluble salts, acids being solid at room temperature, monosaccharides and polysaccharides to a film thickness of 0.1–200 nm, and washing off the coating film together with contaminants by water or a surfactant-containing water.

When water or the surfactant-containing water is used as a cleaning agent, the water-soluble coating film formed on the glass surface can easily be removed.

As the method for cleaning, there is a method wherein a glass product with the water-soluble coating film is dipped in a washing tank in which a cleaning agent is put, or a method for scattering a cleaning agent on the glass surface. In use of such method for cleaning, an auxiliary cleaning tool such as a ultrasonic device, a brush and so on may be used.

Figure 4:
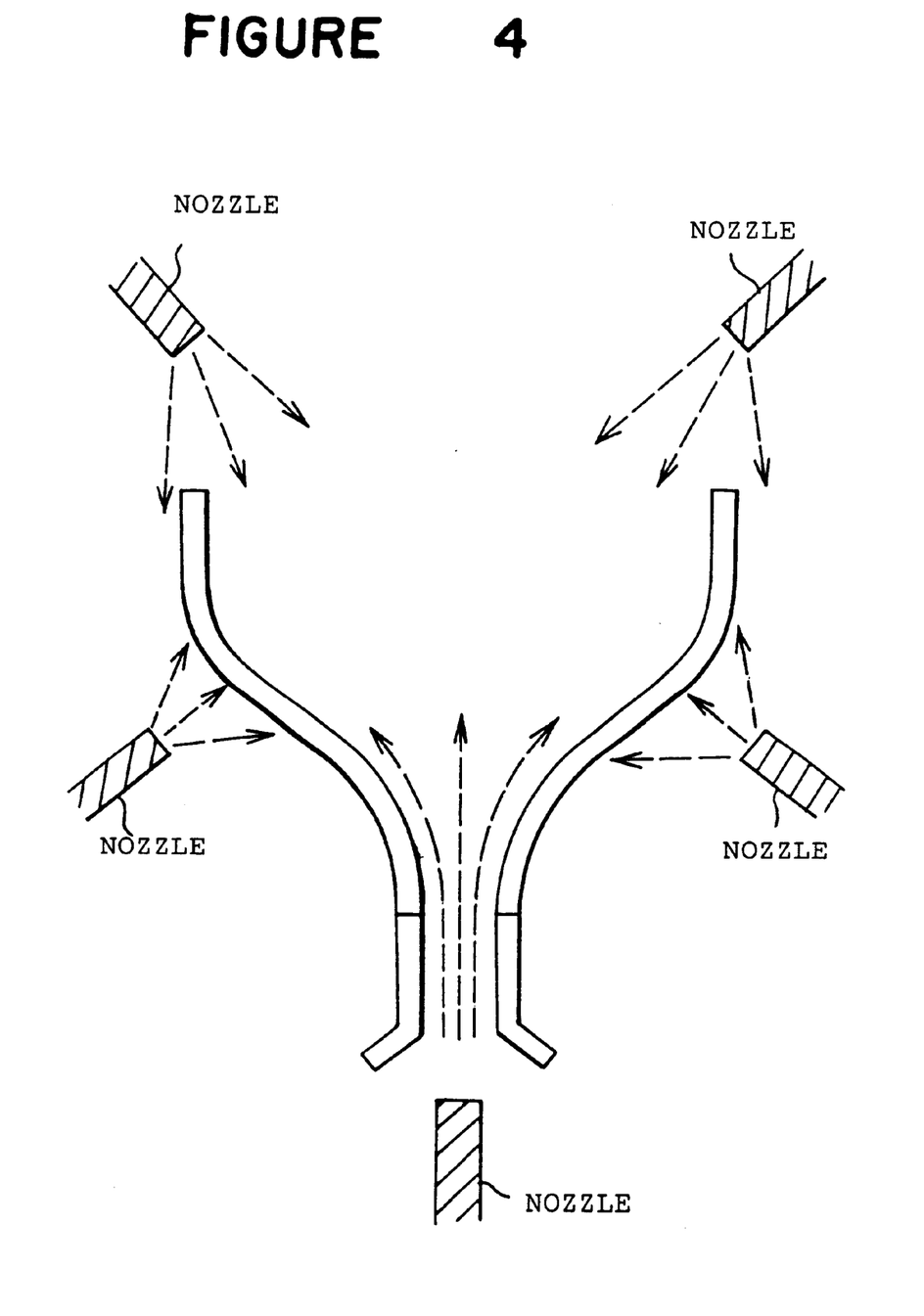
FIG. 4 is a diagram showing an example of cleaning a funnel glass with a water-soluble coating film.

Since the funnel glass has a complicated three-dimensional curved surface, it is desirable to use a cleaning method capable of cleaning uniformly outer and inner surfaces of the funnel portion and the neck tube portion. The water-soluble coating film having electric conductivity remaining on the neck tube portion deteriorates the dielectric strength. Accordingly, the cleaning agent should be scattered sufficiently on the neck tube portion. For this purpose, a cleaning device having a showering structure for scattering independently the cleaning agent on each part of the funnel glass is preferably used as shown in FIG. 4.

When the cathode ray tube glass is washed with water, the contaminants are dissolved into water along with the coating film formed on the glass surface and they can easily be separated from the glass surface. Accordingly, the glass surface which is in a clean state is easily obtainable before the formation of the water-soluble coating film. As a result, the cathode ray tube glass having excellent anti-staining performance and facilitating washing of the glass surface effectively can be obtained, and a problem such as a defect of patterning of a fluorescent material or a failure of dielectric strength, which may be resulted from contaminants inevitably deposited on the glass surface can be resolved.

Further, in accordance with the present invention, there is provided a cathode ray tube glass wherein a functional coating film is formed on the glass surface of the cathode ray tube glass which is cleaned by the above-mentioned cleaning method.

As the functional coating film, there are an electric conductive film, an electromagnetic shielding film, an anti-reflection film, a colored film and so on. The functional coating film can be formed by a conventional technique. Thus, the cathode ray tube glass with the functional coating film can easily be produced with high efficiency by forming the functional coating film subsequent to the cleaning method of the present invention.

Now, the present invention will be described in detail with reference to Examples. However, it should be understood that the present invention is by no means restricted by such specific Examples.

EXAMPLE 1

A case of using a funnel glass as the cathode ray tube glass will be described.

First, the funnel glass having a size of picture area of 15 inches was dipped in a 3% HF aqueous solution for 1 minute, and then, washed with water. Then, the funnel glass was dipped in an aqueous solution containing 0.02 mol/l of sodium tetraborate, and then, quickly dried with a jet fan to form a coating film of sodium tetraborate ($Na_2B_4O_7.10H_2O$, which will be used in the same manner hereinbelow) on inner and outer surfaces of the funnel glass. As a result of an ESCA surface analysis, the film thickness was 5 nm.

Figure 5:
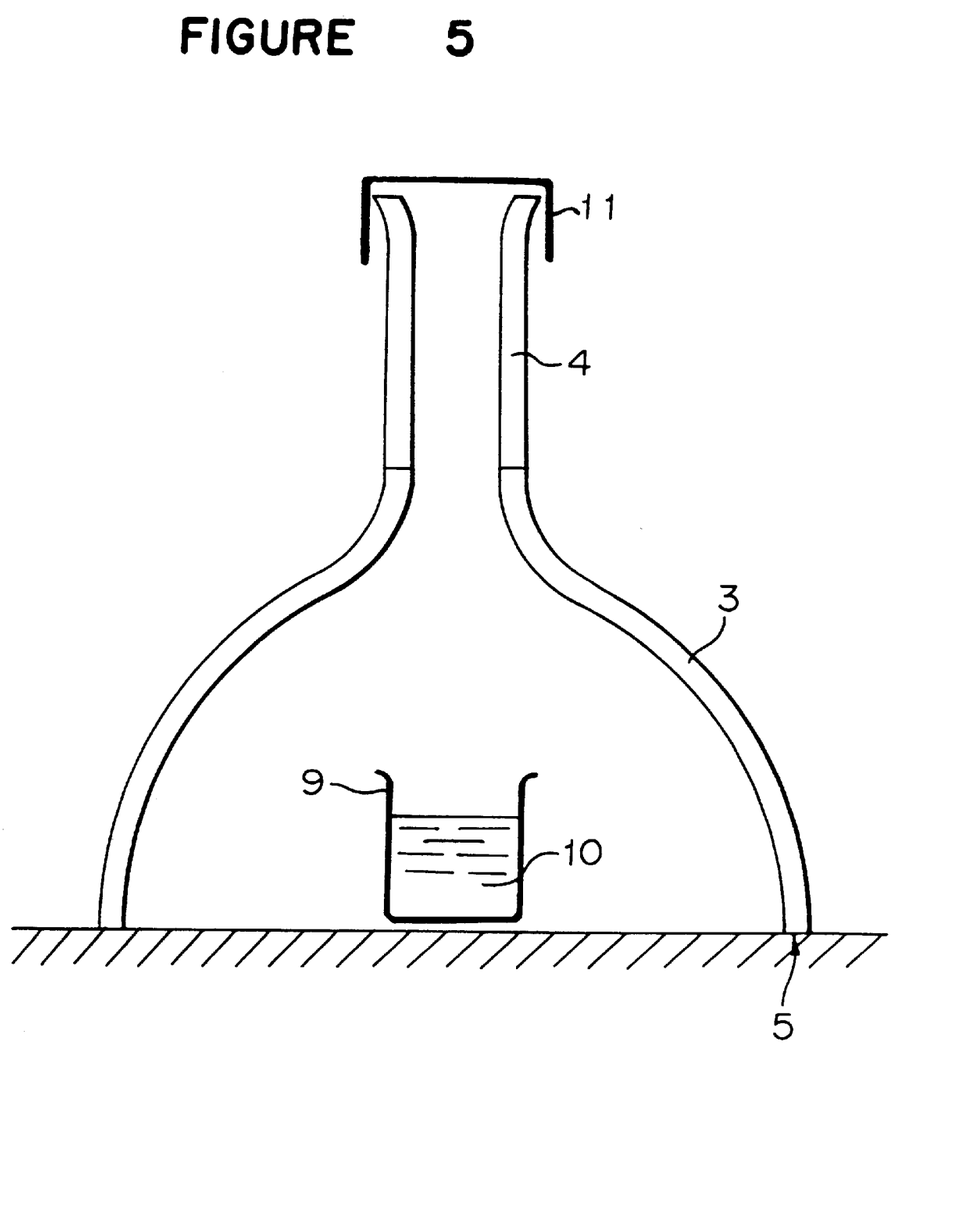
FIG. 5 is a diagram showing an example of a pseudo-contamination operation for the funnel glass.

A "pseudo-contamination operation" was conducted to the surfaces of the funnel glass on which the coating film of sodium tetraborate was formed, and thereafter, contaminants were deposited on the coating film. As a pseudo-contamination material in the "pseudo-contamination operation", dioctyl phthalate (DOP) which is a typical plasticizer and which can be an agent for water repellency on a glass product was used. As shown in FIG. 5, DOP 10 was filled in a glass container 9, and the funnel glass was put on the glass container 9 so as to direct the seal edge portion 5 downward. The opened end portion of the neck tube portion 4 was closed with a separately prepared glass cap 11 so that DOP 10 was diffused and filled in the funnel glass. The funnel glass was kept at room temperature in this state for 1 month whereby the funnel glass was in a forcibly contaminated state.

Then, the surfaces of the funnel glass was washed with water to remove the coating film of sodium tetraborate followed by quickly drying. Just after the drying, an electric conductive carbon slurry was coated on an inner surface of the funnel glass. The coating was finished without the slurry being repelled. Thus, it was confirmed that contamination by DOP applied to the surface of the funnel glass was washed off together with the coating film of sodium tetraborate on the glass surface by the ordinary washing operation.

Comparative Example 1

In the same manner as Example 1, the funnel glass was dipped in the HF aqueous solution followed by washing with water and drying. The pseudo-contamination operation was conducted without forming the water-soluble coating film on the funnel glass. The pseudo-contamination operation was conducted in the same manner as Example 1.

The funnel glass was washed in the same manner as Example 1, and then, the electric conductive carbon slurry was applied to an inner surface of the funnel glass. As a result, there was found that the slurry was repelled at several portions in the inner surface of the funnel glass. It was confirmed that the ordinary washing operation with water could not satisfactory remove contaminants attached to the glass surface.

Comparative Example 2

In the same manner as Example 1, the funnel glass was dipped in the HF aqueous solution, and then, washed with water. Then, the funnel glass was dipped into an aqueous solution containing 0.02 mol/l of sodium tetraborate followed by naturally drying (air-drying).

Then, the pseudo-contamination operation was conducted in the same manner as in Example 1. In inspecting the outer appearance of a neck tube portion of the funnel glass, it was confirmed that the coating film, which was uniform just after the coating, showed partly opaqueness by agglomeration and transparency in the outer appearance of that portion, which is required for product inspection, was lost.

The film thickness of the coating film in the opaque portion at the neck tube portion was 300 nm in measurement. In this case, when the water-soluble coating film was simply air-dried, the film thickness of the coating film was partly increased to become opaque.

Comparative Example 3

In the same manner as Example 1, the funnel glass was dipped into the HF aqueous solution, and then, washed with water. Then, the funnel glass was dipped into an aqueous solution containing 0.2 mol/l of sodium tetraborate followed by air drying. The film thickness of the coating film on the glass surface was 300 nm in measurement.

Then, the pseudo-contamination operation was conducted in the same manner as in Example 1. In inspecting the outer appearance of the funnel glass, it was confirmed that the coating film, which was uniform just after the coating, showed partly opaqueness by agglomeration and transparency in the outer appearance, which is required for various product inspections, was lost. Further, in the observation of the coating film with a microscope, a number of cracks were found. Further, the electric conductive carbon slurry was applied to an inner surface of the funnel glass in the same manner as Example 1. As a result, there occurred that the slurry was partly repelled. Thus, it was confirmed that when the film thickness of the coating film formed was too thick, the thickness of the coating film became ununiform with the result of invasion of contaminants into the coating film whereby an anti-staining effect was reduced.

Comparative Example 4

A coating film of 0.05 nm thick was formed on a surface of the funnel glass in the same manner as Example 1 except that the aqueous solution containing sodium tetraborate was replaced by an aqueous solution containing 0.0001 mol/l of sodium tetraborate. Then, the pseudo-contamination operation was conducted in the same manner as Example 1. In inspecting the outer appearance of the funnel glass, it was confirmed that a transparent outer appearance could be maintained.

After the pseudo-contamination operation, the electric conductive carbon slurry was applied to an inner surface of the funnel glass in the same manner as Example 1. As a result, there was found the slurry repelled at several portions of the inner surface of the funnel glass. It was confirmed that when the film thickness of the coating film formed was too thin, the effect of forming the coating film was insufficient and an anti-staining function was insufficient.

EXAMPLE 2

A funnel glass having a picture area size of 15 inches was used.

First, a seal edge portion of the funnel glass was polished to have a necessary roughness and the funnel glass was washed with water in accordance with steps in I shown in FIG. 2. Immediately after this, an aqueous solution containing 0.02 mol/l of sodium tetraborate was showered to the glass (at the position indicated by A in I in FIG. 2). Then, the aqueous solution was quickly dried with use of a jet fan to thereby form a coating film of 5 nm thick on inner and outer surface of the glass.

Then, the pseudo-contamination operation and the application of the electric conductive carbon slurry were conducted in the same manner as Example 1. The coating was finished without causing any repellency of the slurry. As a result, it was confirmed that excellent anti-staining performance and a cleaning performance could be obtained.

Comparative Example 5

A funnel glass of a picture area size of 15 inches was used. In the same manner as Example 2, a seal edge portion was polished to have a necessary roughness followed by washing with water. Then, the funnel glass was quickly dried with the jet fan. The funnel glass after having been dried was left with the seal edge portion directing upward at room temperature for 1 month. Then, the aqueous solution containing 0.02 mol/l sodium tetraborate was showered to the funnel glass (at the position indicated by B in I in FIG. 2). Then, the aqueous solution was quickly dried with the jet fan to form a coating film of a film thickness of 5 nm on inner and outer surfaces of the glass.

The pseudo-contamination operation was conducted to the funnel glass in the same manner as Example 1. The electric conductive carbon slurry was applied to the funnel glass in the same manner as Example 1. Then, there occurred slurry repellency at several portions in the inner surface of the funnel glass including the neck tube portion. It was found that in order to realize a sufficient anti-staining performance and cleaning performance, the coating film should be formed on a cleaned portion immediately after the washing operation so as to prevent contaminants from attaching.

Comparative Example 6

A funnel glass of a picture area size of 15 inches was used. Operations were conducted until a neck sealing step in accordance with the process in I shown in FIG. 2. Then, the thus treated funnel glass was gradually cooled followed by washing with water. Just after this, an aqueous solution containing 0.02 mol/l of sodium tetraborate was showered to the funnel glass in the same manner as Example 2. The aqueous solution was quickly dried with the jet fan (at the position indicated by C in I in FIG. 2) to thereby form a coating film of 5 nm thick on inner and outer surfaces of the glass.

Then, operations after the polishing of the seal edge portion were conducted in accordance with the process in I shown in FIG. 2. Then, the pseudo-contamination operation and the application of the electric conductive carbon slurry were conducted to the funnel glass in the same manner as Example 1. Then, there was found a number of portions where the slurry was repelled in an inner surface of the funnel glass. It is supposed that since the polishing of the seal edge portion and the washing treatment have been conducted after the formation of the coating film, the formed coating film has been removed by the washing and accordingly, the coating film having a sufficient film thickness for providing an anti-staining function have not been formed on the glass surface (about 0.05 nm).

EXAMPLE 3

A funnel glass of a picture area size of 15 inches was used. Operations were conducted in accordance with process in II shown in FIG. 2 wherein steps of neck sealing, gradually cooling, washing with water were conducted, and immediately after this, showering of an aqueous solution containing 0.02 mol/l of sodium tetraborate and quickly drying with the jet fan (at the position indicated by A in II in FIG. 2) were conducted successively whereby a coating film of a film thickness of 5 nm was formed on inner and outer surfaces of the funnel glass. Then, the pseudo-contamination operation and the application of the electric conductive carbon slurry were conducted in the same manner as Example 1. As a result, the coating was finished without any repellency of the slurry.

Comparative Example 7

Operations were conducted to a funnel glass in the same manner as Example 3 except that the coating film was formed at the position indicated by D in II in FIG. 2 in place of the position of A in II.

The pseudo-contamination operation and the coating of the electric conducive carbon slurry were conducted in the same manner as Example 1. There took place slurry repellency at several portions of the inner surface of the funnel glass. As a result, it was found that in order to realize a sufficient anti-staining performance and cleaning performance, it was necessary to form the coating film by applying the water-soluble material at the final step of the processing operations necessary for obtaining the glass product. In this Comparative Example, it is supposed that the coating film has been washed off during the washing treatment conducted after the neck sealing treatment which is conducted after the formation of the coating film whereby the coating film having a sufficient film thickness for providing an anti-staining effect has not been formed on the glass surface (about 0.05 nm).

EXAMPLE 4

A funnel glass having a picture area size of 15 inches was used. The funnel glass was washed with a 3% HF aqueous solution followed by washing with water. The funnel glass was dipped into an aqueous solution containing 0.02 mol/l of sodium tetraborate, and the aqueous solution was quickly dried with a jet fan to form a coating film of 5 nm thick on inner and outer surfaces of the glass. Then, the funnel glass was washed with a 3% HF aqueous solution according to the process indicated by ① in III shown in FIG. 2, and washed with water and quickly dried with a jet fan. In the surface analysis of the glass surface by ESCA which was conducted immediately after the drying, boron could not be detected, and it was confirmed that the coating film was completely dissolved and removed.

EXAMPLE 5

Operations were conducted in the same manner as Example 4 except that only operations for washing with water and quickly drying with a jet fan were conducted according to the process indicated by ② in III shown in FIG. 2 (wherein HF washing was not conducted) in place of the process indicated by ① in III in FIG. 2. Surface analysis of the glass surface was conducted by ESCA immediately after the drying in the same manner as Example 4. As a result, boron could not be detected, and it was confirmed that the coating film formed on the glass surface was completely dissolved and removed.

EXAMPLE 6

This Example is a case using a panel glass.

First, a panel glass having a picture area size of 15 inches was prepared. Polishing of a face portion of the panel glass and washing were conducted in accordance with the process of I shown in FIG. 3. After this, an aqueous solution containing 0.02 mol/l of potassium tetraborate was scattered on the panel glass followed by quickly drying with a jet fan (at the position indicated by A in I in FIG. 3) to thereby form a coating film of a film thickness of 4 nm on inner and outer surfaces of the glass.

Figure 6:
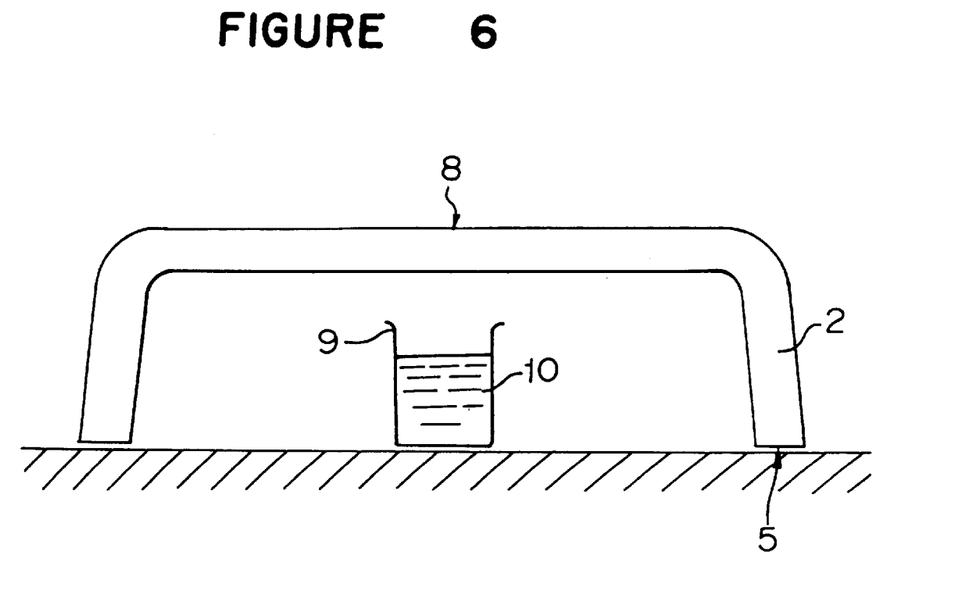
FIG. 6 is a diagram showing an example of a pseudo-contamination operation for the panel glass.

Then, the pseudo-contamination operation was conducted to the panel glass in the same manner as Example 1. Specifically, as shown in FIG. 6, DOP 10 was filled in a glass container 9, and the panel glass 2 was put on the container 9 so as to direct the seal edge portion 5 downward so that DOP was diffused and filled in the panel glass. The panel glass was left at room temperature for 1 month.

Then, the coating film thus formed was washed with water. Immediately after the washing, a photosensitive polymer was coated on an inner surface of the panel glass by a spin coating method followed by drying. Then, a shadow mask was set on the photosensitive polymer, and ultraviolet rays from a mercury lamp were irradiated to the polymer from an upper portion of the shadow mask so that the polymer was exposed to the ultraviolet rays. Then, the shadow mask was removed and a hot water was sprayed to the inner surface of the panel to develop the exposed portion of the polymer. Observing in detail an obtained stripe pattern with a microscope, it was confirmed that no defect was found in the pattern and the photosensitive polymer could correctly be applied.

Comparative Example 8

Figure 3:
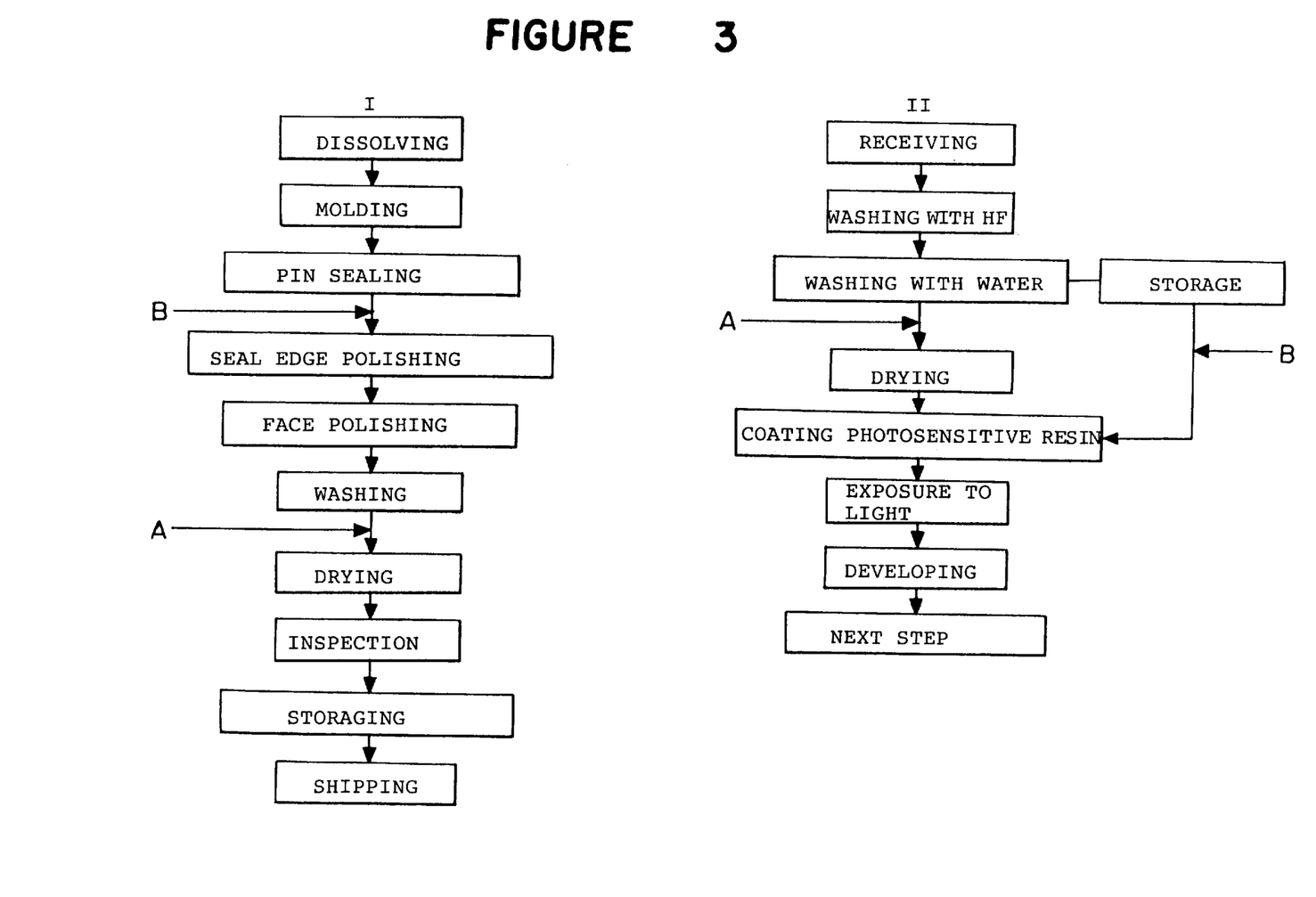
FIG. 3 shows examples of producing a panel glass according to the present invention.

A coating film was formed in the same manner as Example 6 except that the coating film was formed at the position indicated by B in I shown in FIG. 3 in place of the position of A in I. Then, operations for polishing the face portion, washing and drying were conducted in accordance with process in I shown in FIG. 3. The pseudo-contamination operation and the patterning of a photosensitive polymer were conducted in the same manner as Example 6. In a detailed observation of a formed striped pattern with a microscope, it was found that the pattern was discontinuous at several portions and the photosensitive polymer was not correctly applied unlike the case of Example 6. It is supposed that since the polishing of the face portion and the washing treatment have been conducted after the formation of the coating film, the formed coating film was washed off and the coating film having a sufficient film thickness for providing an anti-staining effect has not been formed on the glass surface (about 0.05 nm).

EXAMPLE 7

In accordance with process in II shown in FIG. 3, a panel glass having a picture area size of 15 inches was subjected to dipping in HF and washing with water. Immediately after this, the panel glass underwent scattering of an aqueous solution containing 0.02 mol/l of potassium tetraborate, and quickly drying with a jet fan (at the position indicated by A in II shown in FIG. 3) successively to thereby form a film of 4 nm thick on inner and outer surfaces of the panel glass. Then, the pseudo-contamination operation and the patterning of a photosensitive polymer were conducted in the same manner as Example 6. In detailed observation of a formed striped pattern with a microscope, there was confirmed that no defect was found in the patterned portion and the photosensitive polymer was correctly coated on the glass surface.

Comparative Example 9

A coating film was formed in the same manner as Example 7 except that the coating film was formed at the position indicated by B in II shown in FIG. 3 in place of the position of A in II.

The pseudo-contamination operation and the patterning of the photosensitive polymer were conducted in the same manner as Example 6. In detailed observation of a striped pattern formed on an inner surface of the panel glass with a microscope, there was confirmed that the formed pattern was discontinuous at several portions and the photosensitive polymer was not correctly coated. As a result, it was found that in order to realize a sufficient anti-staining performance and cleaning performance, the coating film should be formed on a cleaned glass surface immediately after the washing with water so as minimize a possibility of attaching contaminants.

EXAMPLE 8

A panel glass having a picture surface size of 15 inches was prepared and a coating film of 4 nm thick, composed of potassium tetraborate, was formed on inner and outer surfaces of the panel glass by using the same treatment as in Example 6. Then, the coating film was removed by washing it with water followed by drying. Then, the panel glass was immediately introduced into a sputtering apparatus. After a vacuum condition was formed, an electric conductive film composed of ITO (indium.tin composite oxide) was formed to have a film thickness of 200 nm. As a result, a panel glass with an electric conductive film free from a defect of outer appearance was obtained.

Comparative Example 10

A panel glass having a picture area size of 15 inches was prepared, and operations of polishing of the face portion, washing with water and drying were conducted in accordance with the process in I shown in FIG. 3. Then, the panel glass was transported into a room and was put in a corrugated box for 1 week. Then, the panel glass was taken out to introduce it into the sputtering apparatus in the same manner as Example 8. In forming an ITO electric conductive film on the panel surface, a number of defects in appearance were found in the electric conductive film.

INDUSTRIAL APPLICABILITY

According to the cathode ray tube glass of the present invention, when the glass surface is simply washed with water, contaminants inevitably attached to the surface of the glass can easily be removed along with a water-soluble coating film which has previously been formed on the glass surface, whereby a cleaned glass surface can easily be obtained. As a result, it is unnecessary to maintain a high degree of cleanness of the atmosphere around the cathode ray tube during manufacture, processing, storage and transportation. Further, it is unnecessary to use, as a cleaning solution for the glass surface, chemicals such as strong alkali, strong acid or the like which were essential in a conventional technique, and it is possible to conduct simply washing with water. As a result, cost for a draining treatment and so on which are necessary for environmental protection can be reduced.

Further, according to the present invention, the attachment of the contaminants on the glass surface can be prevented, and the glass surface of the cathode ray tube glass can be in a cleaned state by removing easily contaminants inevitably attached thereto. As a result, there is provided the cathode ray tube glass capable of reducing remarkably a problem of film formation such as a defect of repellency caused by the attachment of contaminants which was problematic for various surface treatments conducted to the glass surface of the cathode ray tube.

Further, use of a water-soluble coating film having electric conductivity provides an antistatic effect to the cathode ray tube glass coated with the coating film whereby attachment of foreign matters such as fine glass powder can be minimized. As a result, occurrence of flaws caused by the contact or friction of the cathode ray tube glass with jigs for transportation can be reduced.

Further, the present invention facilitates obtaining a cathode ray tube glass with a functional coating film.

What is claimed is:

1. A cathode ray tube glass, which comprises a cathode ray tube made of glass and a coating film thereon, said coating film comprising at least one water-soluble material selected from the group consisting of acids being solid at room temperature, monosaccharides, and polysaccharides, in which the coating film is formed on a cleaned glass surface of the cathode ray tube in an amount of about 0.01 to 100 $\mu g/cm^2$; wherein said coating film has a thickness of about 0.1 to 200 nm;

wherein the acid being solid at room temperature is composed of at least one acid selected from the group consisting of orthoboric acid, orthophosphoric acid and organic acids; the monosaccharide is selected from the group consisting of glucose and galactose; and the polysaccharide is selected from the group consisting of starch and agar.

2. The cathode ray tube glass of claim 1, wherein said water-soluble material is said acid being solid at room temperature.

3. The cathode ray tube glass of claim 1, wherein said water-soluble material is said monosaccharide.

4. The cathode ray tube glass of claim 1, wherein said water-soluble material is said polysaccharide.

5. A cathode ray tube glass, which comprises a cathode ray tube made of glass and a coating film thereon, said coating film comprising at least one water-soluble material selected from the group consisting of acids which are solid at room temperature, monosaccharides and polysaccharides, in which the coating film is formed on a cleaned glass surface of the cathode ray tube to a film thickness of about 0.1 to 200 nm;

wherein the acid which is solid at room temperature is composed of at least one selected from the group consisting of orthoboric acid, orthophosphoric acid and organic acids; the monosaccharide is selected from the group consisting of glucose and galactose; and the polysaccharide is selected from the group consisting of starch and agar.

6. The cathode ray tube glass of claim 5, wherein said water-soluble material is said acid being solid at room temperature.

7. The cathode ray tube glass of claim 5, wherein said water-soluble material is said monosaccharide.

8. The cathode ray tube glass of claim 5, wherein said water-soluble material is said polysaccharide.

* * * * *